United States Patent [19]

Dayton

[11] Patent Number: 4,793,938

[45] Date of Patent: Dec. 27, 1988

[54] METHOD AND APPARATUS FOR DECONTAMINATING DRY CLEANING FLUID AND FILTERS

[76] Inventor: James E. Dayton, P.O. Box 1563, Colton, Calif. 92324

[21] Appl. No.: 932,202

[22] Filed: Nov. 18, 1986

[51] Int. Cl.⁴ ............................................. D06F 43/08
[52] U.S. Cl. .................................. 210/774; 210/805; 210/183; 210/184; 210/187; 210/323.2; 68/18 F; 134/10
[58] Field of Search ............... 210/182, 183, 184, 186, 210/195.1, 323.2, 333.01, 416.1, 456, 532.1, 774, 805, 187; 203/12, 170, DIG. 13; 8/158; 68/18 F, 18 L, 18 R; 134/10, 11, 12

[56] References Cited

U.S. PATENT DOCUMENTS

| | | | |
|---|---|---|---|
| 396,234 | 1/1889 | Roake | 210/186 |
| 3,066,519 | 12/1962 | Boswinkle et al. | 68/18 F |
| 3,168,469 | 2/1965 | Abdalion et al. | 68/18 F |
| 3,674,650 | 7/1972 | Fine | 68/18 F |
| 4,220,535 | 9/1980 | Leonard | 210/456 |
| 4,513,590 | 4/1985 | Fine | 68/18 F |

Primary Examiner—Richard V. Fisher
Assistant Examiner—Wanda L. Millard
Attorney, Agent, or Firm—Charles H. Thomas

[57] ABSTRACT

A system is provided for purging contaminants from dry cleaning fluid used in a machine for dry cleaning clothing while concurrently decontaminating the filter cartridges through which the dry cleaning fluid is passed. The system is coupled in a recirculating loop to and from a machine for dry cleaning clothing. A plurality of filter cartridge housings are employed so that one filter cartridge housing can be selected and isolated from the dry cleaning machine, while the other filter housings remain in the recirculation loop. A portion of the dry cleaning fluid in the selected housing is vaporized within the filter housing while another portion is forced in liquid form through the filter cartridges in a direction opposite to the flow in the recirculation loop. This liquid portion is passed to a separate boiler for vaporization. The vaporized dry cleaning fluid from both the filter housing and the boiler is condensed and passed to a gravity separator, where water is separated from the dry cleaning fluid. The dry cleaning fluid is then returned to the recirculation loop.

19 Claims, 3 Drawing Sheets

FIG. 2

METHOD AND APPARATUS FOR DECONTAMINATING DRY CLEANING FLUID AND FILTERS

BACKGROUND OF THE INVENTION

1. Field of the Invention

The present invention relates to a method and apparatus for reclaiming dry cleaning fluid and for unclogging dry cleaning fluid filter cartridges which are coupled in a recirculation loop with a machine for dry cleaning clothing.

2. Description of the Prior Art

At present, dry cleaning establishments utilize machines for dry cleaning clothing which employ recirculating dry cleaning fluid. The dry cleaning fluid which is typically employed is perchlorethylene, which is known in the dry cleaning industry as "perk". Perchlorethylene will be referred to herein as "perk". As perk is used in conventional dry cleaning systems, it becomes contaminated in machines for dry cleaning clothing because the contaminants on the clothing become entrained in the perk. For this reason machines for dry cleaning clothing are invariably coupled in a recirculation loop with a filter housing which contains filter cartridges. Contaminated perk from the dry cleaning machine is passed through the filter cartridges, which remove many of the contaminants from the perk by filtration. The filtered perk is then returned to the dry cleaning machine for reuse.

Conventional filter housings are pressurized, tubular hollow vessels of generally cylindrical shape. Each filter housing accommodates various numbers of filter cartridges. Each filter cartridge is an annular structure which employs some fiberous filtration material such as paper. The filter cartridges which are commercially available are approximately thirteen and one-half inches in outer diameter and have central axial openings approximately three inches in diameter. The filter cartridges are approximately eighteen inches in axial length and are separated within the filter housing by annular, felt spacers, which have an outer diameter of approximately six inches.

Perk is introduced into the filter housing at a radial inlet near one end of the housing. The perk travels radially inwardly through the filter cartridges and is withdrawn for recirculation to the machine for dry cleaning clothing through an axial outlet in the filter housing.

As the perk is circulated and recirculated, contaminants build up on the filter cartridges. These contaminants include heavy oils, such as soap, significant amounts of water, and also particulate matter, such as lint. Ultimately, the filter cartridges become clogged and a significant pressure differential develops between the perk inlet and the perk outlet of the filter housing. Naturally, this pressure differential impedes the flow of perk through the filter housing.

In conventional dry cleaning systems, one filter cartridge will last through use in dry cleaning approximately two thousand pounds of clothing. When the filters become clogged it is the standard, conventional practice to remove and discard the filters. The filters are removed through an access hatch at the end of the filter housing opposite the perk inlet and outlet. The filters, as they become contaminated, tend to bulge. Upon removal, the filter cartridges typically rupture. Filter cartridges currently cost about $50.00 a piece, and no system presently exists for salvaging them once they have been used. Also, when filter cartridges are removed they contain about twenty gallons of perk. This perk must be replaced, as must the filter cartridges themselves, each time the filter cartridges are changed. The replacement of the perk represents a significant expense, in addition to the cost of the replacement filter cartridges.

A further problem in dry cleaning fluid filter cartridge replacement which has become increasingly acute is that the clogged filter cartridges, each containing approximately five gallons of perk, represent a form of highly toxic waste. Storage of this toxic waste is difficult, due to the fact that the ruptured filter cartridges leak, and must be encased in rugged disposal containers. Furthermore, as waste disposal sites become filled, and as the long term, adverse effects of toxic waste at waste disposal sites have become increasingly apparent, the disposal of clogged dry cleaning fluid filter cartridges has become increasingly difficult and expensive. Indeed, at present in some geographic areas disposal of contaminated dry cleaning cartridges is prohibited, and dry cleaning establishments are finding it increasingly difficult to arrange for the removal of old filter cartridges from their premises.

SUMMARY OF THE INVENTION

One principal object of the present invention is to provide a method and apparatus for decontaminating dry cleaning filter cartridges at the site where they are used with machines for dry cleaning clothing, without removing the cartridges from the filter housing. By removing contaminants from the filter cartridges while the cartridges remain within the filter housings, the life of the filter cartridges is prolonged dramatically. Indeed, it may well be possible to rejuvenate dry cleaning filter cartridges indefinitely, in using the method and apparatus of the present invention.

Another very important object of the invention is to vastly reduce the amount of toxic waste which is produced incident to the operation of dry cleaning establishments. Since the filter cartridges are reused, there is no need for periodic disposition of cartridges containing perk. Moreover, according to the method and process of the invention, both the filter cartridges and the perk utilized in the dry cleaning recirculation loop are purged of contaminants without the generation of toxic waste. Thus, the perk utilized in dry cleaning clothing may be used and reused extensively.

A further object of the invention is to vastly reduce the cost of operating commercial dry cleaning establishments. This cost savings is achieved both by obviating the necessity for replacing the filter cartridges, and by reducing significantly the amount of perk which is consumed in dry cleaning operations.

Yet another very important object of the present invention is to provide a system which does not require cessation of operation of the machine for dry cleaning clothing while the recirculation loop is purged of contaminants. According to the preferred embodiments and practices of the invention, a plurality of filter housings are provided, each containing a plurality of dry cleaning fluid filter cartridges. While the set of filter cartridges in one housing is being purged of contaminants, other cartridges in at least one other filter housing remain on line in the recirculation loop, so that there is no interruption to the dry cleaning process. Purified perk, which results from the operation of the system of the invention, is passed back into the recirculation loop. The several filter housings containing the different sets of filters may alternatively be switched into and out of the recirculation loop. When isolated from the recirculation loop, the filter cartridges are decontaminated utilizing the system of the invention.

In one broad aspect the present invention may be considered to be an improved method of filtering and recirculating dry cleaning fluid which employs annular dry cleaning fluid filter means located within a filter housing and coupled in a recirculation loop with a machine for dry cleaning clothing, and in which dry cleaning fluid is passed through the filter maans in a single direction. According to the improved method, the filter means and filter housing are first decoupled from the recirculation loop to isolate them from the machine for dry cleaning clothing. Dry cleaning fluid is then forced through the filter means in a direction opposite to the single direction of flow in the recirculation loop. The dry cleaning fluid is forced out of the filter housing to flush contaminants from the dry cleaning filter means. Also, the dry cleaning fluid is distilled to vaporize and separate it from unvaporized contaminants. The vaporized dry cleaning fluid is then condensed to liquid form. Water and other lighter contaminants are separated from the liquified dry cleaning fluid. The liquified dry cleaning fluid is then passed to the machine for dry cleaning clothing for reuse. Ultimately, the filter means and the filter housing are recoupled in the recirculation loop.

In another broad aspect the invention may be considered to be a dry cleaning fluid filtration and filter decontamination system. The system is comprised of a plurality of pressurized filter housings each containing annular dry cleaning fluid filter cartridges. Means are provided for selectively coupling the filter housings in a dry cleaning fluid recirculation loop to a machine for dry cleaning clothing wherein the dry cleaning fluid flows in a single direction through the filter cartridges, and alternatively for isolating a selected one of the filter housings from the machine for dry cleaning clothing. Means are coupled to the filter housings for reversing the direction of dry cleaning fluid flow through the filter cartridges and for forcing dry cleaning fluid out of a selected and isolated filter housing. Distillation means are used to vaporize dry cleaning fluid received from the selected and isolated filter housing. Condensing means are coupled to the distillation means for cooling the vaporized dry cleaning fluid to liquid form. Gravity separator means are coupled to the distillation means for separating the dry cleaning fluid from lighter substances. Means are provided for passing the dry cleaning fluid to the machine for dry cleaning clothing.

In yet another broad aspect the invention may be considered to be an improvement to a system for filtering dry cleaning fluid received from a machine for dry cleaning clothing which employs a tubular pressurized filter housing adapted to accommodate a plurality of longitudinally aligned annular filter cartridges wherein recirculating dry cleaning fluid is received at the filter housing from the machine for dry cleaning clothing and is passed in a first radial direction through the filter cartridges for recirculation to the machine. The improvement of the invention involves the provision of means for selectively isolating the filter housing from the machine for dry cleaning clothing. A means is provided for vaporizing one portion of dry cleaning fluid in the filter housing and for forcing another unvaporized portion of dry cleaning fluid in liquid form in a direction radially opposite to the first direction through the filter cartridges. A boiler means is coupled to the filter housing for receiving the dry cleaning fluid in liquid form and for thereafter vaporizing the dry cleaning fluid. Condensing means are provided for receiving the vaporized dry cleaning fluid from the filter housing and from the boiler means and for liquifying the dry cleaning fluid therewithin. Gravity separting means are provided for separating the liquified dry cleaning fluid from lighter impurities. A means is provided for passing dry cleaning fluid from the gravity separating means to the machine for dry cleaning clothing.

In preferred embodiments of the system of the invention, the means for vaporizing or distilling is comprised of a steam supply and serpentine loops of conduit inside each filter housing. These loops of conduit are adapted for coupling to the steam supply to form a closed loop. As the steam passes in closed loop circulation through the conduit in the filter housing, one portion of the perk therewithin is vaporized by the heat from the steam which is conducted through the walls of the conduit. The pressure within the filter housing is regulated and builds up so that an unvaporized portion of the perk is forced through a drain to a separate boiler, and the vaporized portion is passed directly to a cooling tower which serves as a condensing means. In the boiler, heavier, unvaporized contaminants are drained off and the portion of the perk which is received in liquid form from the filter housing is also distilled. The separate boiler is also preferably a pressurized container which defines a vaporization chamber. The boiler is cylindrical in shape, and is equipped with heating coils disposed about its interior surface. The heating coils are coupled to the supply of steam in a closed loop, and the vaporization chamber is heated by conduction through the walls of the conduit.

Preferably also, the system includes a cold water supply which may also be coupled in a closed loop to the serpentine loops of conduit in the filter housing. Means are provided, in the form of valving, for selectively and alternatively coupling the steam supply and the cold water supply to the serpentine loops of conduit in the filter housing. The cold water is circulated through the serpentine loops of conduit in the filter housing which remains on line in the recirculation loop with the machine for dry cleaning clothing. Preferably, the temperature of the cold water as it enters a filter housing that is on line with the dry cleaning machine is no greater than about sixty or seventy degrees Fahrenheit. Temperatures of as high as eighty to one hundred degrees Fahrenheit may be acceptable. However, if the temperature of the cooling water is too high, the outlet temperature of the filtered perk will be excessive. This can cause dyes to run in the clothing that is being dry cleaned. As previously noted, the serpentine conduit loops in each filter housing may be alternatively coupled to the steam supply when that filter housing is isolated from the dry cleaning machine and the perk is to be boiled out of the filter cartridges.

Also in a preferred embodiment of the invention, a steam supply and a compressed air supply are provided for selective and alternative coupling to the vaporization chamber of the boiler. Valving is employed to selectively and alternatively couple the vaporization chamber of the boiler to either the steam supply or the compressed air supply, or to alternatively isolate the boiler from both the steam and compressed air supply. Steam is supplied to the boiler to rapidly heat the boiler during the distillation or vaporization process. The supply of steam to the boiler is maintained throughout most of the distillation process when the presence of moisture in the boiler is not undesirable. The rushing steam also cleans out the outsides of the coils of conduit in the boiler.

The vaporization chamber of the boiler may alternatively be connected to a compressed air supply to raise the temperature in the boiler and rid the boiler of moisture. Compressed air is usually supplied to the boiler when the vaporization chamber of the boiler cylinder is nearly empty. The use of compressed air serves to blow sludge out of the vaporization chamber. During normal running conditions, when none of the filter housings are being purged of contaminants, neither steam nor compressed air are supplied to the boiler.

A compressed air supply is also preferably utilized in a system in which a plurality of filter housings are employed. The filter housings are joined by an intecconnecting conduit which selectively couples the filter housings to each other. By properly manipulating appropriate valving, compressed air may be utilized to force dry cleaning fluid out of one selected filter housing and into another selected filter housing through the interconnecting conduit when the valving therein is open so that the selected filter housings are coupled to each other. This system is particularly useful where the filter housings which are horizontally disposed, are arranged vertically one above another, and it is desired to pump perk from a lower filter housing to a filter housing located at a higher elevation.

The invention may be described with greater clarity and particularity by reference to the accompanying drawings.

DESCRIPTION OF THE EMBODIMENT AND IMPLEMENTATION OF THE METHOD

Figure 1:
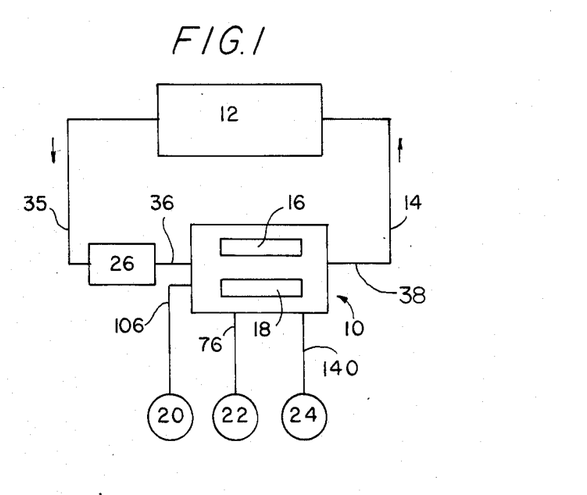
FIG. 1 is a diagramatic illustration of a dry cleaning fluid filtration and filter decontamination system according to the invention coupled in a recirculation loop with a machine for dry cleaning clothing.

FIG. 1 illustrates in functional block diagram form a system 10 for filtering dry cleaning fluid connected to a machine 12 for dry cleaning clothing. The filtration system 10 and the dry cleaning machine 12 are connected together in a recirculation loop 14, through which dry cleaning fluid normally flows in a direction indicated by the directional arrows during dry cleaning operations. In the embodiment depicted, the dry cleaning fluid filtration and filter decontamination system 10 includes two filter housings indicated diagramatically at 16 and 18 in FIG. 1. A steam supply 20, a cold water supply 22, and a compressed air supply 24 are all coupled to the filtration system 10, by inlet lines 106, 76 and 140 respectively. A lint trap 26 is locate in the recirculation loop 14 downstream from the machine 12 for dry cleaning clothing and upstream from the filter housings 16 and 18. The lint trap 26 is connected to the dry cleaning machine 12 by line 35 and to the filtration and filter decontamination system 10 by line 36.

Figure 2:
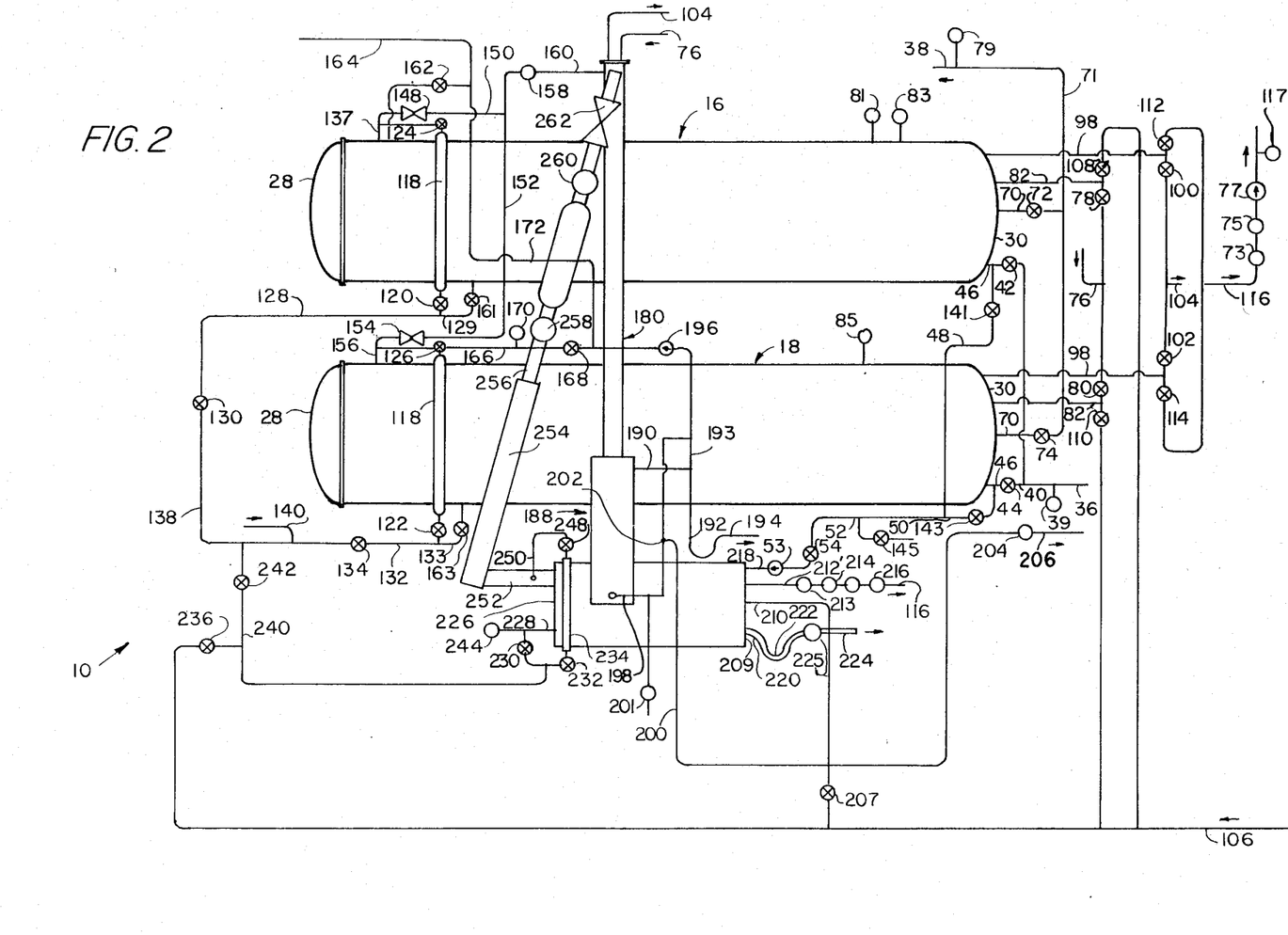
FIG. 2 is a flow diagram illustrating a preferred embodiment of the filtration and decontamination system of FIG. 1.

The filtration and decontamination system 10 is depicted in detail in FIG. 2. Each of the filter housings 16 and 18 is pressurized and is constructed with tubular, cylindrical steel walls 32. Each filter housing is about seventy four inches long and has convex outer ends 28 and 30, as illustrated. The construction of the filter housings is identical, and the interior of the filter housing 16 is illustrated in the plan sectional view of FIG. 3. The rounded ends 28 and 30 of the filter housing 16 have been broken away in FIG. 3 to allow the interior end assemblies within the filter housing to be illustrated with greater clarity.

The Filter Housings

Figures 3, 4, 5, 6, 7, 8:
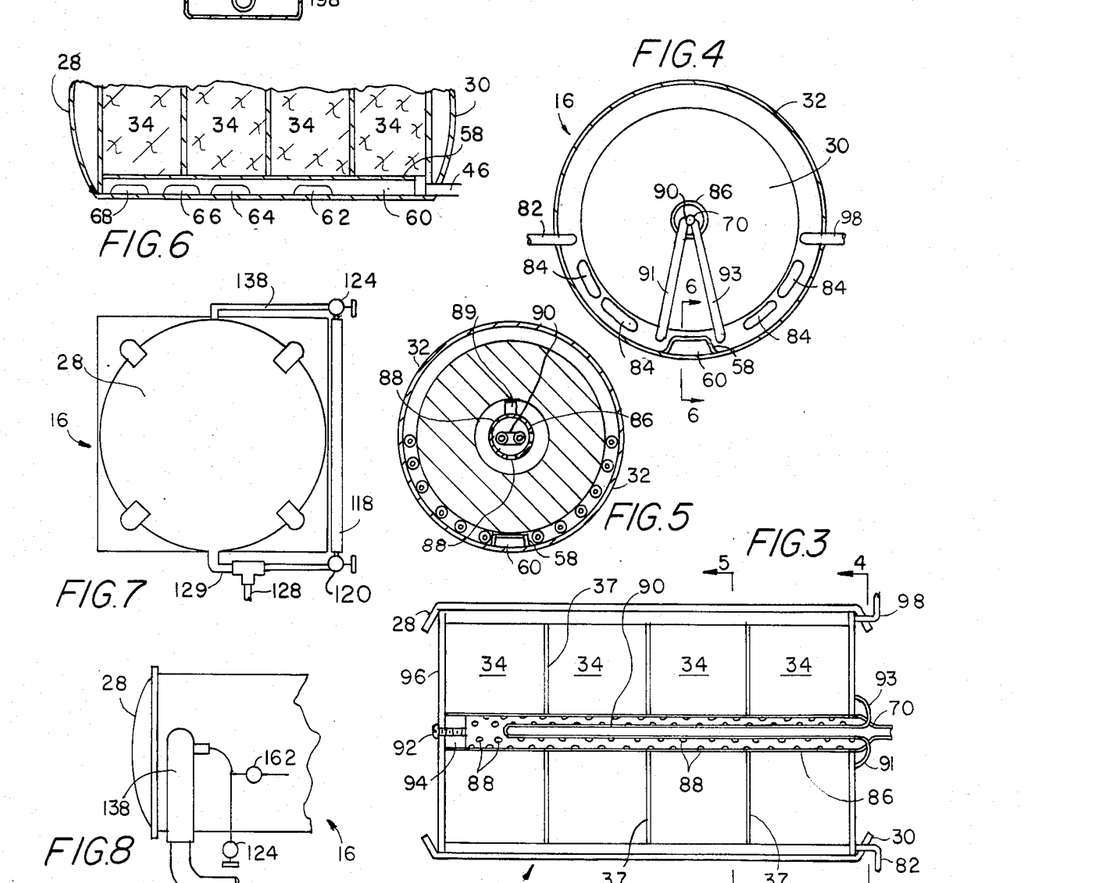
FIG. 3 is a sectional plan view of one of the filter housings depicted in FIG. 2.
FIG. 4 is a sectional end view taken along the lines 4—4 of FIG. 3.
FIG. 5 is a sectional view taken along the lines 5—5 of FIG. 3.
FIG. 6 is a longitudinal sectional elevational detail taken along the lines 6—6 of FIG. 4.
FIG. 7 is an exterior end view of one end of one of the filter housings depicted in FIG. 2.
FIG. 8 is a top plan detail of one end of one of the filter housings depicted in FIG. 2.

Both the filter housing 16 and the filter housing 18 are adapted to receive a plurality of coaxially aligned filter cartridges 34. The filter cartridges 34 are of annular configuration and are of the conventional construction and size which are commercially available. That is, the filter cartridges 34 each have an outer diameter of approximately fourteen inches and an inner diameter of approximately four and one half inches. Each filter cartridge 34 is approximately thirteen and one-half inches in axial width. The interior diameter defined by the cylindrical wall 32 of the filter housing 16 and 18 is approximately sixteen inches. This affords adequate marginal space for the filter cartridges 34 to expand radially as they entrap lint and other contaminants.

With reference to FIGS. 1 and 2, the recirculation loop 14 defines a perk inlet 36 and a perk outlet 38 which is in communication with the ends 30 of the filter housings 16 and 18. The perk inlet line 36 has a pressure gauge 39 and is branched to provide parallel perk inlet supply lines 46 to perk inlet control valves 42 and 44. The perk inlet control valve 42 is coupled to the perk inlet line 46 of the filter housing 16, while the perk inlet control valve 44 is coupled to the perk inlet line 46 of the filter housing 18. Between the filter housings 16 and 18 and their respective perk inlet control valves 42 and 44 there are branch lines 48 and 50 which join in a line 52 leading to a perk drain control valve 54 and to a check valve 53 for a boiler 56. Cylinder drain valves 141 and 143 allow selective drainage of the filter housings 16 and 18. Valve 145 allows perk to be drained to the dry cleaning machine 12, while valve 54 allows the perk to be drained to the boiler 56.

The perk inlet lines 46 to the filter housings 16 and 18 pass through the housing ends 30 and empty into the interior cavities defined within the filter housings 16 and 18 at the peripheral margins thereof radially outwardly from the filter cartridges 34.

Each of the filter housings 16 and 18 has an internal longitudinal channel 58 located at its periphery. The channels 58 are disposed radially outwardly from the filter cartridges 34 and are in alignment with the perk inlet lines 46. The channel 58 of the filter housing 16 is visible in FIGS. 4, 5 and 6. The channel 58 faces the filter housing wall 32 to define a duct 60 which is approximately two inches wide and one inch in height, the height being measured in a radial direction relative to the axis of the filter housing. The duct 60 is aligned with the perk inlet line 46 and commences approximately one inch from the end 30. The duct 60 extends the entire remaining length of the filter housing.

As depicted in FIG. 6, transverse slots 62, 64, 66 and 68 are defined on both sides of the walls of the channel 58 at spaced intervals therealong. Each of the slots 62-66 extends longitudinally a distance of approximately eight inches. As illustrated in FIG. 6, the slots 62-66 are not uniformly spaced along the length of the channel 58, but are much more closely spaced toward the end 28 of the filter housing remote from the perk inlet line 46.

During the normal dry cleaning operations perk travels in the recirculation loop 14 from the perk inlet line 46 and into the duct 60 defined by the channel 58. The slots 62-68 in the channel 58 serve to more uniformly distribute perk along the length of the filter housings 16 and 18, since the perk would otherwise tend to flow radially inwardly through the filter cartridges 34 located next to the ends 30. This would result in the uneven collection of contaminants by the different filter cartridges 34.

From the duct 60 the perk flows radially inwardly through the porous filter cartridges 34 toward the central, axial annulus defined therewithin. This axial space leads to the filtered perk outlet 70 in each of the filter housings 16 and 18.

Perk outlet flow from the filter housings 16 and 18 is governed, respectively, by adjustable throttling valves 72 and 74. The filtered perk outlet lines 70 are joined downstream from valves 72 and 74 at line 71 which ccarries the perk to the perk outlet 38, where pressure is monitored by means of a pressure gauge 79. The perk travels through the perk return line 38 to the dry cleaning machine 12 in the recirculation loop 14.

In the use of the filtration system 10 to merely filter perk as it is received from the dry cleaning machine 12, the valves 42, 44, 72 and 74 are all open, and valve 54 is closed. Perk enters the filtration system 10 through perk inlet 36 and passes through valves 42 and 44 to the perk inlet lines 46 in the ends 30 of the filter housings 16 and 18. Within the filter housings the perk travels down the duct 60 and passes laterally through the slots 62-66 and radially inwardly through the filter cartridges 34. The filtered perk then passes longitudinally back in the opposite direction along the filter housing axis and out of the filter housings 16 and 18 through the filtered perk outlet lines 70.

The cold water supply 22 is connected to the filtration system 10 by means of a cooling water inlet line 76, depicted in FIGS. 1 and 2. The cooling water inlet line 76 is branched and is directed to valves 78 and 80, which in turn are coupled to inlet lines 82 to the filter housings 16 and 18. Within each of the filter housings 16 and 18 there are a series of longitudinally elongated serpentine peripheral loops of conduit constructed of five-eighths inch diameter copper tubing indicated at 84 in FIGS. 4 and 5. The conduit loops 84 extend longitudinally back and forth along the length of each of the filter housings 16 and 18 at the peripheries thereof and are disposed radially outwardly from the filter cartridges 34, but in close proximity thereto. In the center of each of the filter housings 16 and 18 there is a hollow, radially perforated central core pipe 86 which has an external diameter of two and one-half inches within each filter housing. Throughout its length the core pipe 86 is radially perforated by numerous openings 88. A longitudinal strap 89 is welded to the top of the outer surface of the hollow core pipe 86 and extends the length of the core pipe 86. The strap 89 is three-eighths inches wide and stand radially outwardly from the core pipe 86 a distance of one quarter of one inch. The strap 89 serves to hold the filter cartridges 34 centered within the filter housings 16 and 18. At the end 30 the core pipe 86 joins the filtered perk outlet 70 at a junction formed by a bell fitting which reduces the passageway diameter from two inches within the core pipe 86 to a one and one-quarter inch diameter at the filtered perk outlet 70.

Disposed within the hollow core pipe 86 there is an elongated central loop 90 of the copper conduit which extends axially from the end 30 of each filter housing and terminates approximately four inches from the end 28 so that it is unlikely to be damaged by engagement of the three-eighths inch threaded bolt 92 which is threadably engaged in the end plug 94 that is welded to the end of the core pipe 86 at the filter housing end 28. The bolt 92 is used to urge an annular compression collar 96 against the series of filter cartridges 34, so as to immobilize and center the filter cartridges 34 within the filter housings 16 and 18. The filter cartridges 34 are separated from each other by felt spacers 37, as illustrated in FIG. 3.

The peripheral serpentine loops 84 of conduit are connected in series with the central elongated loop 90 of conduit at the center of the series of loops within the filter housings 16 an 18. The inlet line 82 to each of the filter housings 16 and 18 is coupled in series with several of the peripheral loops 84, which in turn are connected in series with the central loop 90 by the conduit section 91, depicted in FIGS. 3 and 4. The central loop 90 is connected to several more of the peripheral loops 84 by the conduit section 93, and the conduit emanates from each filter housing at an outlet line 98. The outlet lines 98 lead to valves 100 and 102 which, if open, allow the water to be ejected through a cooling water discharge line 104.

During operation of the dry cleaning machine 12 with both of the filter housings 16 and 18 in the recirculation line 14, cooling water enters the filter housings 16 and 18 through inlet lines 82. The cooling water preferably enters the serpentine loops 84 and 90 at a temperature of between about 60 and 70 degrees Fahrenheit. The cooling water within the conduit loops 84 and 90 cools the perk as the perk is fed to the filtered perk outlet line 70 to prevent the temperature of the filtered perk from rising excessively. If perk from the filtered perk outlet 70 is fed to the dry cleaning machine 12 at too great a temperature, it will cause dyes to run in the clothing being dry cleaned. The cooling water which emanates from the filter housings 16 and 18 is heated by conductive contact with the flowing perk, and typically leaves the filter housings 16 and 18 at a temperature of between about 100 and 120 degrees Fahrenheit.

The steam supply 20 may also be connected to the serpentine loops 84 and 90. The steam inlet line 106 is coupled to steam inlet control valves 108 and 110, which also lead to the inlet lines 82 that are in turn connected to the serpentine loops 84 and 90. Likewise, the outlet lines 98 from the serpentine loops 84 and 90 are in communication with steam outlet control valves 112 and 114, which are connected together at a steam discharge line 116. Discharge line 116 is sequentially connected to a strainer 73, a steam trap 75 and a check valve 77. A pressure gauge 117 monitors the pressure in the steam discharge line 116.

When the filter housings 16 and 18 are to be cooled, as when both of the filter housings 16 and 18 are coupled in the recirculation line 14, the valves 78, 80, 100 and 102 are all open. This allows cooling water to enter the filter housings 16 and 18 through the inlet lines 82 and to leave the filter housings 16 and 18 through the outlet lines 98 and valves 100 and 102. During this time valves 108, 110, 112 and 114 are all closed so that the steam supply 20 is isolated from the conduit forming the serpentine loops 84 an 90.

Conversely, when the filter cartridges 34 within one of the filter housings 16 and 18 are to be purged of contaminants, it is necessary to supply steam to the selected filter housing in order to heat the interior thereof. For example, when the filter cartridges 34 within the filter housing 16 are to be decontaminated, it is necessary to supply steam to the inlet line 82 to the filter housing 16, while maintaining the flow of cold water through the serpentine loops 84 and 90 in the filter housing 18. The perk inlet and outlet valves 42 and 72 to the filter housing 16 are first closed. The cooling water valves 78 and 100 are then closed, and the steam valves 108 and 112, which respectively supply and withdraw steam to and from the filter housing 16, are opened. In this condition the loops 84 and 90 within the filter housing 16 will receive steam, but the filter housing 18 will remain in the recirculation loop 14 on line with the dry cleaning machine 12 and will continue to receive cooling water.

To purge the filter cartridges 34 within the filter housing 18, the perk inlet and outlet valves 44 and 74 are first closed and the cooling water valves 80 and 102 are likewise closed. The steam valves 110 and 114 are thereupon opened, so that steam is admitted from steam inlet line 106 through the valve 110 and through the inlet line 82 to the loops 84 and 90. Spent steam is discharged through the line 98 and through the open valve 114 to the steam discharge line 116. When both the filter housings 16 and 18 are to be returned to an on line connection in the recirculation loop 14, the valves 78, 80, 100 and 102 are all opened and the valves 108, 110, 112 and 114 are all closed. The steam supply 20, the steam inlet line 106, the steam inlet control valves 108 and 110, the inlet lines 82, the serpentine loops 84, the central elongated loop 90, the outlet lines 98, the steam outlet control valves 112 and 114, and the steam discharge line 116 all form a portion of a distillation means coupled to the filter housings 16 and 18. This portion of the distillation means vaporizes one portion of dry cleaning fluid in a selected and isolated filter housing.

A pressure gauge 81 and a temperature gauge 83 are used to monitor pressure and temperature, respectively, in filter housing 16. Filter housing 18 also has a temperature gauge 85. The gauge 170 serves to monitor pressure in the filter housing 18.

The filter housings 16 and 18 each have a separate sight glass 118, as illustrated in FIGS. 2 and 7. The sight glasses 118 are utilized to determine liquid level within each of the filter housings 16 and 18. Flow through the bottom ends of the sight glasses 118 for the filter housings 16 and 18 is governed by throttling valves 120 and 122, respectively. Similarly, flow through the top ends of the sight glasses 118 for the filter housings 16 and 18 is governed by valves 124 and 126, respectively. The valve 120 is coupled by a tee to line 128 and to line 129. One end of line 129 radially enters the wall of the filter housing 16 in communication with the enclosure therewithin. A valve 161 can be closed to allow compressed air to be forced through the sight glass 118 for the filter housing 16. The line 128 is connected to a control valve 130. Similarly, the valve 122 is connected by a tee junction to lines 132 and 133. Line 133 radially enters the filter housing 18 in communication with the cavity defined therein. Valve 163 serves the same purpose as valve 161. The line 132 is connected to a valve 134. The valves 130 and 134 are both coupled together by a common line 138 which in turn is coupled to the compressed air supply 24 by line 140.

The compressed air supply 24 is utilized to blow perk from one filter housing to the other, as will hereinafter be described. This is especially useful in order to transfer perk from the filter housing 18 to the filter housing 16, which is vertically elevated relative to the filter housing 18.

A vent line 137 on the top of the filter housing 16 is connected both to the valve 124 at the upper end of the sight gauge 118 and also to a vapor valve 148. The vent line 137 is used to expel vapors from the enclosure of the filter housing 16. The vapor valve 148 is also connected to a vapor outlet line 150 which intersects a vapor outlet line 152 leading from the vapor valve 154 for the filter housing 18. The vapor valve 154 is connected by line 156 to the top of the filter housing 18 for communication with the cavity therewithin. The vapor outlet lines 150 and 152 are joined and together are coupled to a sight glass 158. A vapor line 160 leads from the sight glass 158 to the top of the condenser which is a cooling tower 180.

The vent line 137 is also connected to a vent valve 162. The vent valve 162 is connected to a vent line 164 that leads to the dry cleaning machine 12. The valve 126 at the top of the sight glass 118 of the filter housing 18 is connected by a line 166 which leads to a vent valve 168. A pressure gauge 170 measures the pressure in line 166. The vent valve 168 is also connected to the vent line 164 by a connecting line 172.

During operation of the dry cleaning machine 12 with both the filter housings 16 and 18 in the recirculation line 14, the vapor valves 148 and 154 are both closed. During decontamination of the filter housing 16 the vapor valve 148 is at least partially opened. Vaporized perk is thereby able to pass from the enclosure of the filter housing 16 through the vapor valve 148 to the cooling tower 180. Conversely, when the filter housing 18 is to be decontaminated, the vapor valve 154 is opened, so that vaporized perk may pass through line 156, through the vapor valve 154 to line 160 which is the vapor inlet to the top of the cooling tower 180.

The Cooling Tower

Figure 12:
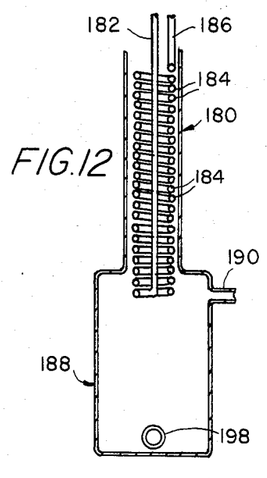
FIG. 12 is a sectional elevational view of the lower portion of the cooling tower and gravity separator of FIG. 2.

The cooling tower 180 is depicted in detail in FIG. 12. The cooling water inlet line 76 is connected to the top of the cooling tower 180, as well as to valves 78 and 80. The cooling water inlet line 76 is connected to a five eighths inch diameter copper conduit 182 which is vertically oriented and is centrally located within the cooling tower 180. At the bottom of the cooling tower 180 the cooling conduit 182 is formed into tightly wound helical coils 184 which pass around the inner circumference of the four inch inner diameter cooling tower 180 over a longitudinal distance of approximately sixteen inches. The helical coils 184 terminate in a linear length of copper tubing which serves as a cooling water outlet and which is indicated at 186. The cooling water outlet 186 is connected to the cooling water discharge line 104.

The Gravity Separator

The helical coils 184 extend linearly approximately two inches below the cooling tower 180 into a gravity separator tank 188. The gravity separator tank 188 is approximately eight inches in inner diameter and about sixteen inches in length. A contaminated waste water outlet 190 is located at the upper extremity the gravity separator tank 188. The waste water outlet 190 is connected through a U-shaped trap 192 to a waste water discharge 194. This discharge is connected to the local municipal sewer system. The upper end of the U-shaped trap 192 is connected by line 193 through a check valve 196 to the connecting line 172 leading to the vent line 164. Connection of the U-shaped trap 192 to the vent line 164 prevents siphoning of liquid through the U-shaped trap 192. The check valve 196 prevents a pressure buildup at the top of the U-shaped trap 192 and allow vapors to pass upwardly to the vent line 164, but prevents liquid from running back down the line 172 to the U-shaped trap 192.

At the bottom of the gravity separator tank 188 there is a distilled perk outlet line 198 for the perk which, when it reaches the bottom of the gravity separator tank 188, is condensed, distilled and separated from water which flows through the upper waste water outlet 190. Distilled perk outlet line 198 also has a tee which leads to a valve 201 which allows the separator 188 to be drained. The distilled perk outlet line 198 is also connected to the line 193 which leads to the vent line 164 through the check valve 196. A distilled perk tap line 200 is connected as a branched outlet to the line 198. The junction of line 200 with line 198 is indicated at 202 in FIG. 2. The level of the junction 202 must be slightly below the level of the waste water outlet line 190 to ensure gravity separation of water and other lighter contaminants in the waste water line 190 from the distilled perk in the outlet line 198. The vertical distance of separation between the level of the waste water outlet 190 and the junction 202 is preferably about two inches. This vertical spacing achieves an optimum separation between water in the waste water outlet 190 and perk in the distilled perk tap line 200. From the distilled perk tap line 200, the perk travels through a sight glass 204 to line 206, where it is passed as distilled dry cleaning fluid to the dry cleaning machine 12.

The Boiler

Figure 9:
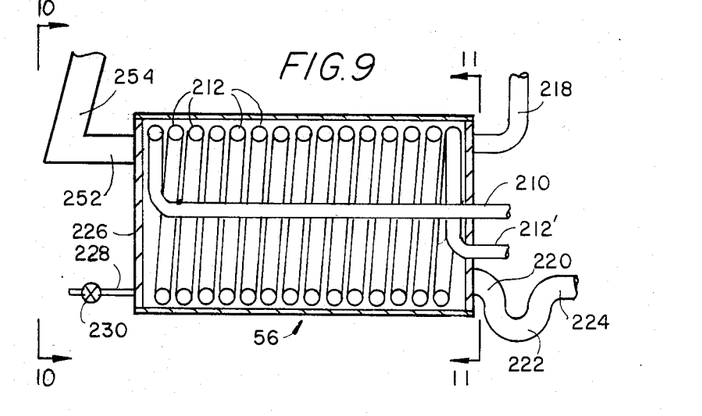
FIG. 9 is a sectional elevational detail of the boiler depicted in FIG. 2.

The structure of the boiler 56 is illustrated in detail in FIG. 9. The boiler 56 is a steel, cylindrical drum shaped structure having an internal diameter of approximately twelve inches and an overall length of approximately forty two inches. As illustrated in FIG. 2, the steam inlet line 106 is connected to a five-eighths inch diameter copper conduit that forms a steam inlet tube 210 which enters the boiler 56 through the rear circular face 209 thereof and extends the length of the boiler, as illustrated in FIG. 9. The steam inlet tube 210 terminates in a series of helical coils 212 which are packed together throughout the length of the boiler 56 at the inner surface thereof. At the interior surface of the face 209 of the boiler 56 the copper conduit is turned and emerges as a steam outlet line 212'. From the steam inlet tube, 210 to the steam outlet line 212' the boiler 56 contains approximately two hundred feet of five eighths inch copper tubing. The steam outlet line 212' is connected to a strainer 213, which in turn is connected to a steam trap 214. The steam trap 214 is coneected to a check valve 216, which in turn is coupled to the steam discharge line 116.

The boiler 56 defines a vaporization chamber into which a contaminated perk inlet 218 empties at the top of the rear face 209. A drain 220, with a U-shaped trap 222 formed therein, is connected to the face 209 in communication with the boiler vaporization chamber at the lowermost point thereof. Oil and other residue which is heavier than the perk is discharged through the drain 220. These heavy impurities in the perk are discharged through a waste discharge line 224 which has a sludge drain valve 225. The primary material that is discharged through the drain 220 is soap.

At the opposite end 226 of the boiler 56 a line 228 is connected through valves 230 and 232 to the bottom of a transparent sight glass 234. The steam inlet line 106 is connected through a valve 236 to line 240 which is connected to both of the valves 230 and 232. The line 240 is also connected through a valve 242 to the line 138. A temperature gauge 244 monitors the temperature in the boiler 56. The spare port 233 is plugged.

At the top of the sight glass 234 there is another valve 248 which is connected to a line 250 which is joined to the wall of a two inch pipe 252 and in communication with the passageway within the pipe 252. The pipe 252 carries vaporized perk and water out of the boiler 56 and is coupled by an elbow to a four inch diameter expansion pipe 254 which is inclined at an angle of approximately forty five degrees relative to vertical. When the valves 230, 232 and 248 are open, the level of liquid within the vaporization chamber of the boiler 56 can be monitored by means of the sight glass 234.

The pipe 254 is approximately two feet in length and terminates at a junction with a two inch pipe 256. The enlarged diameter of the expansion pipe 254 allows it to accommodate overexpansion of vapors. The pipe 256 carries vapors past a pair of sight glasses 258 and 260 to a throttling valve 262. The throttling valve 262 is used to regulate pressure within the boiler 56 and to control the flow of vapor to the cooling tower 180.

Figure 10:
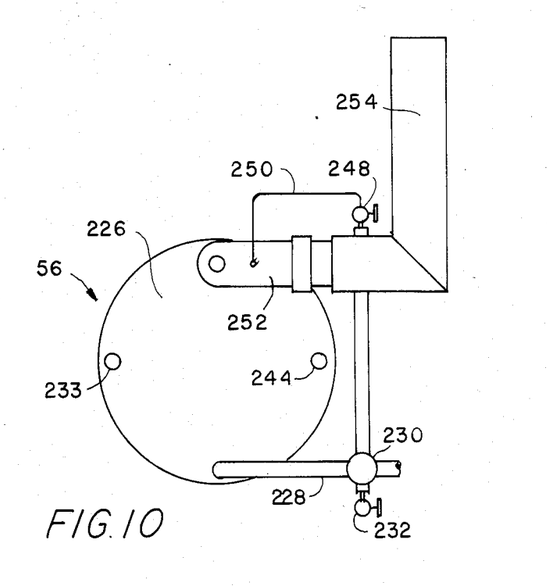
FIG. 10 is a elevational end view taken along the lines 10—10 of FIG. 9.
Figure 11:
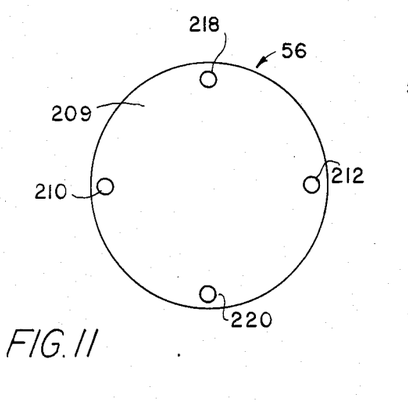
FIG. 11 is an opposite end elevational view taken along the lines 11—11 of FIG. 9.

FIGS. 10 and 11 respectively illustrate the inlet and outlet connections to the circular faces 209 and 226, respectively, of the boiler 56.

The boiler 56, the lines 46, the valves 141 and 143, the branch lines 48 and 50, the line 52, the drain control valve 54, the check valve 53 and the line 218, together with the valve 207, the steam inlet tube 210, the steam supply 20 and the steam inlet supply line 106, all form a portion of a distillation means. This portion of the distillation means receives dry cleaning fluid in liquid form and thereafter vaporizes it.

The Lint Trap

Figure 13:
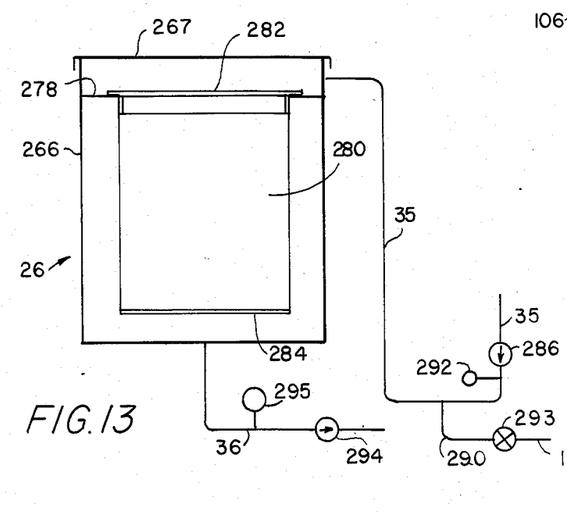
FIG. 13 is a sectional elevational diagram of the lint trap of FIG. 1.

FIG. 13 illustrates the structure of the lint trap 26 depicted in FIG. 1. The lint trap 26 is constructed of a hollow, cylindrical canister 266 having a lid 267 releasably sealed thereto and near the top of which an annular, interiorly directed flange or collar 278 is formed. A cylindrical annular drum shaped lint filter element 280 is supported in the annular opening of the flange 278 by means of a rod handle 282 to which the filter element is attached. The rod handle 282 is longer than the diameter of the filter element 280 and extends transversely across the opening and rests upon the flange 278. The walls and floor of the lint filter element 280 are formed of 20 mesh screen constructed of number 20 stainless steel wire. The screen filter element 280 is thirteen inches in diameter and thirty inches in length. A stiffening rod 284 at the bottom of the screen filter element 280 maintains the cylindrical shape of the screen.

The inlet line 35 to the lint trap 26 contains contaminated perk from the dry cleaning machine 12. The contaminated perk reaches the lint trap 26 through a check valve 286. A pressure gauge 292 monitors pressure in the inlet line 35. The compressed air supply line 140 is coupled through a valve 293 to line 290, which intersects the inlet line 35 at a tee junction. The outlet line 36 from the lint trap 26 also has a pressure gauge 295 and is directed through a check valve 294, through which the perk must pass for recirculation to the filter housings 16 and 18.

The construction of the lint trap 26 is particularly advantageous compared with that of conventional dry cleaning lint trap. By constructing the cylindrical lint filter element 280 of 20 mesh number 20 stainless steel screen, a lint trap is produced which can be easily cleaned. To clean the lint trap 26, the valve 293 is opened to admit compressed air through compressed air inlet 140 from the compressed air source 24. The compressed air is blocked from the dry cleaning machine 12 by the check valve 286, and is directed through the line 35 to the pressurized canister 266 of the lint trap 26. Perk is forced out of the lint trap 26 through the line 36 and through the check valve 294. The valve 293 is then closed and the lid 267 of the lint trap 26 is removed to expose the lint screen filter element 280. The filter element 280 can be easily lifted from its seat atop the collar 278. The bucket-shaped lint screen filter element 280 is then inverted. Due to the particular structure of the lint screen filter element 280, lint will not cling to the stainlsss steel wire mesh screen, but rather will roll out and fall easily from the filter element 280. The filter element 280 can then be reinserted into the canister 266 and the lid 267 can again be resealed thereatop. In contrast, lint on conventional dry cleaning lint filter elements tends to cling to the filter element and can be removed only with considerable difficulty.

Operation

Until such time as the filter cartridges 34 become clogged, btth of the filter housings 16 and 18 will normally remain on line in the recirculation loop 14 to filter perk as it is returned from the machine 12 which is used for dry cleaning clothing. In this condition the valves 78, 80, 100 and 102 will remain open and valves 108, 110, 112 and 114 will remain closed. During this condition the vapor valves 148 and 154 will also remain closed.

When filter cartridges 34 in the filter housings 16 and 18 become clogged, a pressure differential will ddevelop between the perk inlet line 36 to the filtration unit 10 and the perk outlet line 38 therefrom. This pressure differential can be ascertained by monitoring pressure gauges 39 and 79 and typically results from a buildup of water, soap and other contaminants in the fiberous material of which the filter cartridges 34 are constructed. When this occurs, it is appropriate to flush the contaminants out of the filter cartridges 34, and to distill the perk so a to rid the system of contaminants.

To decontaminate the filter cartridges 34 in the filter housing 16, the filter housing 16, and the filter cartridges 34 therewithin, are decoupled from the machine 12 for dry cleaning clothing by closing the perk inlet valve 42 and the perk outlet valve 72 to the filter housing 16. The vent valve 162 is then opened and the drain valve 54 to the boiler 56 is opened as well. The perk will then begin to drain from the filter housing 16 to the boiler 56 through lines 46, 48 and 52 and through the open valve 54.

The cold water valves 78 and 100 to the filter housing 16 are then closed and the steam valves 108 and 112 are opened. Cooling water within the serpentine loops 84 and 90 in the filter housing 16 is thereupon replaced by hot steam, supplied through the steam supply line 106. The steam is preferably supplied at a pressure of at least 80 psi, and preferably 90 to 100 psi. The steam passing through the peripheral loops 84 and the central loop 90 causes the perk to begin to boil, since perk boils at 254 degrees Fahrenheit. The vaporized perk is passed through line 138 and vapor valve 148 and through the open valve 158 to the vapor inlet line 160 to the cooling tower 180.

The pressure generated by the perk within the filter housing 16 as it vaporizes and expands aids in forcing the perk through the filter cartridges 34 in a direction opposite to the direction of flow that exists when the filter housing 16 is connected in the recirculation loop 14. That is, the pressure from the expanding perk vapor aids in forcing the perk out of the filter housing 16 toward the boiler 56.

To further aid in reversing the direction of flow of the perk in the system, the compressed air source 24 may be connected to the selected and isolated filter housing 16 to build pressure therewithin. This is accomplished by opening the valve 130 so that compressed air flows from line 140 through lines 138, 128 and 129 and into the cavity defined within the filter housing 16. The pressure of the compressed air aids in forcing perk out of the filter housing 16, through lines 46 and 48 and through line 50 into the filter housing 18, as well as through valve 54 into the boiler 56.

Steam is also supplied under pressure to the boiler 56 from steam inlet line 106 through valve 207 and through steam inlet tube 210. As the perk is passed in a reverse flow through the filter cartridge 34, it flushes the contaminants therefrom and carries those contaminants to the boiler 56 through contaminated perk inlet line 218. The steam entering the boiler 56 through steam inlet line 210 raises the temperature in the boiler 56 to an elevated level sufficient to boil both perk and water within the boiler, but not so high as to boil away oils and other residue. Preferably, the internal temperature of the boiler 56 is about 355 degrees Fahrenheit, or even slightly greater.

Together, the boiler 56 and the steam heated interior of the filter housing 16 act as a distillation means. One portion of the perk in the filter housing 16 is vaporized within the housing 16 and passed to the cooling tower 180 through the vapor valve 148 and vapor line 160. The other portion of the perk is first passed to the boiler 56, where it is vaporized and channeled to the cooling tower 180 through pipes 252, 254, 256 and through the throttling valve 262. The level of perk in the filter housing 16 is dropped to slightly less than half the volume of the filter housing cavity.

It is sometimes desirable to inject steam directly into the cavity forming the vaporization chamber in the boiler 56 for the purpose of adding additional moisture to the system and for cleaning the outsides of the coils 212 in the boiler 56. Steam may be injected directly into the boiler vaporization chamber from the steam supply line 106 by opening valves 236 and 230. Steam is then injected into the boiler cavity through the line 228. The direct injection of steam also raises the temperature in the boiler quite rapidly.

Alternatively, compressed air may be injected directly into the boiler vaporization chamber from the compressed air supply line 140 by opening valves 242 and 230. Air is then injected into the boiler vaporization chamber through line 228. This is done to build up pressure and to reduce the moisture content in the system. The injection of compressed air also raises the temperature in the boiler 56 and is usually done when the boiler vaporization chamber is nearly empty. The injection of compressed air also has the beneficial effect of blowing sludge out of the boiler cavity.

As the vaporized perk and water travel upwardly from the boiler 56 through the expansion pipe 254, the condition of the fluid can be observed through the sight glasses 258 and 260. The presence of liquid at eihher of the sight glasses, especially the upper sight glass 260, indicates that the temperature of the boiler 56 is too high, and should be decreased.

As the vaporized perk and water arrive at the top of the cooling tower 180 from the throttling valve 62 and the vapor line 160, the vapor is subjected to a vacuum created at the lower end of the cooling tower 180 due to to the condensation of the perk and water on the cooling coils 184. The cold water entering the cooling tower 188 through the cold water inlet line 182 is preferably between about 60 and 70 degrees Fahrenheit. The water leaving the cooling tower through the outlet line 186 should preferably be at a temperature of about 120 degrees Fahrenheit. The coils 184 condense the vaporized liquid water and perk and the condensed liquid falls into the gravity separator tank 188. The condensation process produces a vacuum which aids in maintaining vapor flow from the vapor line 160 and the throttling valve 262.

Water, which represents an impurity in the perk, is withdrawn as waste from the graity separator 188 through the waste water outlet 190. With filter housings 16 and 18 of the volume described, each cylinder housing contains about 60 gallons of liquid. When the filter cartridges 34 become clogged and are decontaminated in the manner described, the amount of waste water withdrawn through the waste water line 190 is typically about twenty gallons. The perk will not travel through the waste water line 190, since it is heavier than water and will sink to the bottom of the gravity separator tank 188, where it is withdrawn through the distilled perk outlet line 198. Of the total liquid content of the filter housings 16 and 18 which is processed using the filter decontamination system of the invention, oil residue is present to the extent of approximately one percent. Oil residue has a higher boiling point than the internal temperature of the boiler 56, and is withdrawn through the drain line 224 in liquid form as waste.

Once the filter cartridges 34 in the filter housing 16 have been purged of contaminants, the filter housing 16 can be returned to on line operation in the recirculation loop 14. To achieve this end, the valves 108, 112 and 162 are closed and the cooling water valves 78 and 100 are opened. The perk inlet and outlet valves 42 and 72 are likewise opened. This places the filter housing 16 back on line in the recirculation loop 14 so that the filter cartridges 34 may filter perk arriving from the dry cleaning machine 12.

The filter housing 18 may be isolated and decoupled from the recirculation loop 14 in order to decontaminate the filter cartridges 34 therein in a manner nearly identical to the process for decontaminating the filter cartridges within the filter housing 16. To isolate the filter housing 18, the vent valve 168 is opened and the perk inlet and outlet valves 44 and 74 are closed. The cooling water inlet an outlet valves 80 and 102 are also closed, and the steam valves 110 and 114 are opened so that steam from the steam inlet line 106 enters the serpentine loops 84 and 90. The drain valve 54 is opened so that perk may be drained to a level about one half inch below the axis of the filter housing 18 as determined by the sight glass 118. As one portion of the perk is being vaporized by heat from the steam within the serpentine loops 84 and 90, another portion of the perk is being drained to the boiler 56 and vaporized within the boiler. The two vaporized portions converge at the top of the cooling tower 180, in the manner previously described. Compressed air may be injected into the cavity of the filter housing 18 through the air inlet line 140 by opening the valve 134. This will increase pressure within the cavity of the filter housing 18 and force an aditional quantity of perk upwardly through line 48 and into the filter housing 16, which remains on line in the recirculation loop 14, as well as into the boiler 56.

Pressure, temperature and liquid levels may be monitored, respectively, by the pressure, temperature and sight gauges described. Occasionally the sight gauges become clogged or dirty. By manipulation of the appropriate valves, air and/or steam may be passed through the sight gauges for cleaning purposes.

As is evident from a description of the structure of the embodiment and implementation of the method, the present invention drastically reduces the necessity for replacement of filter cartridges 34. Indeed, there is every indication that the filter cartridges 34 may be decontaminated repeatedly an indefinite number of times without ever being removed from the cavities of the filter housings 16 and 18. As previously noted, the present invention drastically reduces the amount of toxic waste produced in commercial dry cleaning operations, and at the same time achieves a significant savings in operating costs by reducing the amount of perk and the number of filter cartridges consumed in commercial dry cleaning operations.

Undoubtedly, numerous variations and modifications of the invention will become readily apparent to those familiar with the operation of dry cleaning machines. For example, only two filter housings are included in the embodiment of the filtration and decontamination system described, although the invention is applicable to any number of filter housings. Also, activation of the valves involved may be performed either manually or automatically under servo control. Accordingly, the scope of the invention should not be construed as limited to the specific embodiment depicted or manner of implementation of the method described herein, but rather is defined in the claims appended hereto.

I claim:

1. In a method of filtering and recirculating dry cleaning fluid which employs a plurality of coaxially aligned annular dry cleaning fluid filter means arranged longitudinally along a horizontal axis within a hollow filter housing thereby defining an elongated hollow central core and coupled in a recirculation loop with a machine for dry cleaning clothing and in which dry cleaning fluid is passed through said filter means in a single radial direction, the improvement comprising:

decoupling said filter means and filter housing from said recirculation loop to isolate them from said machine for dry cleaning clothing, forcing a portion of said dry cleaning fluid through said filter means in a radial direction opposite to said single direction and out of said filter housing in unvaporized form to flush contaminants from said dry cleaning filter means by applying heat radially inwardly to the contents of said filter housing from the periphery thereof and by also applying hear radially outwardly to the contents of said filter housing from within said hollow central core to vaporize a portion of said dry cleaning fluid within said filter housing, thereby building pressure within said filter housing to aid in forcing an unvaporized portion of dry cleaning fluid out of said filter housing, distilling separate portions of said dry cleaning fluid within said filter housing and externally thereof to vaporize and separate it from unvaporized contaminants, condensing said vaporized dry cleaning fluid to liquid form, separating water from said condensed liquified dry cleaning fluid, passing said liquified, dry cleaning fluid to said machine for dry cleaning clothing for reuse, recoupling said filter means and said filter housing in said recirculation loop, and passing dry cleaning fluid from said machine for dry cleaning clothing through a lint trap prior to returning said dry cleaning fluid to said dry cleaning fluid filter means.

2. A method according to claim 1 further comprising concurrently draining said unvaporized portion of said dry cleaning fluid from said filter housing into a boiler located externally of said filter housing while applying heat to said filter housing as aforesaid and vaporizing said portion drained from said filter housing by also applying heat to said boiler.

3. A method according to claim 1 which employs a plurality of said filter housings and further comprising alternatively selecting and decoupling one of said filter housings from said machine for dry cleaning clothing while concurrently maintaining the remaining filter housings in said recirculation loop and cooling said retaining filter housings.

4. A dry cleaning fluid filtration and filter decontamination system comprising:

a plurality of hollow filter housings located at differing elevations and each containing a plurality of coaxially aligned annular dry cleaning filter cartridges arranged longitudinally along a horizontal axis thereby defining an elongated hollow central core about which said filter cartridges are disposed, means for selectively coupling said filter housings in a dry cleaning fluid recirculation loop to a maching for dry cleaning clothing wherein said dry cleaning fluid flows in a single radial direction through said filter cartridges and alternatively for isolating a selected filter housing from said machine for dry cleaning clothing, a lint trap coupled in said recirculation loop downstream from said machine for dry cleaning clothing and upstream from said filter housings, means coupled to said filter housings for reversing the radial direction of dry cleaning fluid flow through said filter cartridges and for forcing dry cleaning fluid in an unvaporized form out of a selected and isolated filter housing including peripheral heating means located radially outwardly from said filter cartridges about the periphery of said filter housings for heating the contents of said filter housing radially from without and also axial heating means disposed horizontally within said central core for heating the contents of said filter housings radially from within, distillation means coupled to said filter housings including boiler means for receiving dry cleaning fluid in unvaporized form from said selected and isolated filter housing and for vaporizing said received dry cleaning fluid externally of said selected and isolated filter housing, condensing means coupled to said distillation means for cooling said vaporized dry cleaning fluid to liquid form, gravity separator means coupled to said condensing means for separating said dry cleaning fluid from lighter substances, and means coupled to said gravity separator means for passing said dry cleaning fluid to said machine for dry cleaning clothing.

5. A dry cleaning fluid filtration and filter decontamination system according to claim 4 wherein said distillation means and said means for reversing direction of dry cleaning fluid flow are both comprised of a means for supplying steam coupled to said peripheral heating means and to said axial heating means to heat the interior of said selected and isolated filter housing and to build pressure therein.

6. A dry cleaning fluid filtration and filter decontamination system according to claim 5 wherein said means for reversing direction of dry cleaning fluid flow is additionally comprising of selectively actuable draining means connected to said filter housings for draining dry cleaning fluid from said selected and isolated filter housing.

7. A dry cleaning fluid filtration and filter decontamination system according to claim 6 wherein said filter housings are of cylindrical form and wherein said peripheral heating means is comprised of serpentine peripheral longitudinally oriented loops of conduit disposed radially outwardly from said filter cartridges, and an elongated central loop of conduit disposed axially within said central core and connected in series to said peripheral loops of conduit and further comprising valve means for coupling said conduit loops to said supply of steam.

8. A dry cleaning fluid filtration and filter decontamination system according to claim 7 wherein each of said filter housings is further equipped with a longitudinal channel connected thereto and located therewithin at its periphery and disposed radially outwardly from said filter cartridges, whereby each channel defines a longitudinal duct that aids in equalizing pressure within the filter housing in which it is located.

9. A dry cleaning fluid filtration and filter decontamination system according to claim 8 wherein each channel is formed with longitudinal walls and lateral openings are defined in walls of each of said channels to equalize the distribution of dry cleaning fluid to said cartridges.

10. A dry cleaning fluid filtration and filter decontamination system according to claim 6 further comprising an expansion duct connected between said boiler means and said condensing means.

11. A dry cleaning fluid filtration and filter decontamination system according to claim 6 wherein said means for reversing direction of dry cleaning fluid flow is additionally comprised of means for providing compressed air coupled to said filter housings and selectively connectable to provide compressed air to said selected and isolated filter housing to build pressure therewithin.

12. A dry cleaning fluid filtration and filter decontamination system according to claim 4 further comprising means for supplying pressurized air connected to said recirculation loop upstream from said lint trap and downstream from said machine for dry cleaning, and valve means interposed between said means for supplying compressed air to said recirculation loop to selectively provide compressed air to said lint trap, and wherein said lint trap is comprised of a cylinder formed of 20 mesh number 20 stainless steel wire.

13. A dry cleaning fluid filtration and filter decontamination system according to claim 4 wherein said condensing means is comprised of a vertical cooling tower having an inlet from said selected filter housing at its upper end, an outlet at its lower end into said gravity separating means, and cooling means located at said cooling tower outlet and below said cooling tower inlet.

14. In a system for filtering dry cleaning fluid from a machine for dry cleaning clothing and employing a horizontally disposed, tubular pressurized, hollow filter housing defining an enclosure therewithin adapted to accommodate a plurality of annular filter cartridges longitudinally aligned along a horizontal axis, thereby defining an elongated hollow central core about which said filter cartridges are disposed, wherein recirculating dry cleaning fluid is received at said filter housing from said machine for dry cleaning clothing and is passed in a first radial direction through said filter cartridges in a recirculation loop to said machine, the improvement comprising:

a lint trap coupled in said recirculation loop downstream from said machine for dry cleaning clothing and upstream from said filter housings, isolating means connected between said filter housing and said machine for dry cleaning clothing for selectively isolating said filter housing from said machine for dry cleaning clothing, means connected to said filter housing for vaporizing one portion of dry cleaning fluid in said filter housing and for forcing another unvaporized portion of dry cleaning fluid in liquid form in a radial direction opposite to said first radial direction through said filter cartridges, including peripheral heating means located radially outwardly from said filter cartridges about the periphery of said filter housing for heating said enclosure from without and also axial heating means disposed horizontally within said central core for heating said enclosure radially from within, boiler means connected to said filter housing for receiving said dry cleaning fluid in liquid form therefrom and for vaporizing said dry cleaning fluid received from said filter housing, condensing means coupled to said filter housing and to said boiler means for receiving vaporized dry cleaning fluid from said filter housing and from said boiler means and for liquefying said dry cleaning fluid therewithin, gravity separating means connected to said condensing means for separating liquified dry cleaning fluid from lighter impurities, and means connected to said gravity separating means for passing dry cleaning fluid from said gravity separating means to said machine for dry cleaning clothing.

15. A system according to claim 14 wherein said means for vaporizing is comprised of means for supplying steam and said peripheral heating means is comprised of longitudinally oriented serpentine loops of conduit located about the periphery of said filter housing and connected to said means for supplying steam and said axial heating means is comprised to an elongated loop of conduit disposed coaxially within said central core and coupled to said means for supplying steam, and means for selectively establishing a path of steam flow from said means for supplying steam and through said loops of conduit.

16. A system according to claim 15 further comprised of means for supplying cold water connected to said loops of conduit and means for selectively and alternatively establishing a flow path from said means for supplying steam and from said means for supplying cold water to said loops of conduit.

17. A system according to claim 14 further comprised of a plurality of said filter housings located at differing elevations from each other, interconnecting conduit means for selectively coupling said filter housings to each other, means for supplying compressed air coupled to said filter housings and actuable means interposed between said means for supplying compressed air and said filter housings for selecting a filter housing and for forcing dry cleaning fluid out of said selected filter housing and into another filter housing through said interconnection conduit means when said filter housings are coupled to each other.

18. A system according to claim 14 wherein said boiler means defines a vaporization chamber and further comprising means for supplying steam and means for supplying compressed air both of which are connected to said boiler means and means for selectively and alternatively establishing a flow path from said means for supplying steam and from said means for supplying compressed air to said vaporization chamber of said boiler means.

19. A dry cleaning fluid filtration and filter decontamination system according to claim 14 wherein said pressurized filter housing is cylindrical in shape and said peripheral heating means is comprised of serially connected serpentine heating coils disposed about the periphery of said filter housing, and said heating coils are coupled to a supply of steam.

* * * * *